UNITED STATES PATENT OFFICE.

ROBERT D. POWERS, OF NEW YORK, N. Y., ASSIGNOR TO UNION CLAY PRODUCTS COMPANY, A CORPORATION OF NEW JERSEY.

METHOD OF MAKING COMPOSITIONS FOR COATING.

945,801.   Specification of Letters Patent.   Patented Jan. 11, 1910.

No Drawing. Application filed January 3, 1908, Serial No. 409,234. Renewed September 27, 1909. Serial No. 519,874.

*To all whom it may concern:*

Be it known that I, ROBERT D. POWERS, a citizen of the United States, residing at New York city, in the county of New York and State of New York, have invented certain new and useful Improvements in Methods of Making Compositions for Coating, &c., of which the following is a specification.

My invention relates to the manufacture of a composition of matter suitable for waterproof coatings and other purposes, and my invention consists in the method of production hereinafter set forth.

The basis of the composition is clay, on account of its cheapness and resistant properties, and with this is combined sulfur or a substance containing sulfur, and the materials are heated until the sulfur begins to sublimate, when a suitable vulcanizable oil is added and the whole thoroughly mixed. The oil employed may be cotton seed oil, linseed oil, rosin oil or any oil capable of combining with sulfur to be vulcanized thereby, and to produce the desired composition the oil is added as the heat begins to drive off the sulfur which then will combine with the oil. The temperature employed will generally be from 400° to 450° Fahrenheit, and the oil will be by weight from five to twenty per cent. of the weight of the clay, and the hardness of the composition will increase in proportion to the reduction in the percentage of the oil and increase of temperature at which the admixture is effected, and by continuing the application of heat during the working a further hardened product is secured.

In place of combining sulfur with the clay, a substance containing sulfur, as sulfid of iron, may be used, and the temperature at which the admixture of the materials is effected may be reduced by adding a small proportion, say one per cent., of charcoal or other suitable carbonaceous material.

While the combination of clay and sulfur may be made artificially it is practicable to make use of natural combinations of these materials as found in some classes of clays. For instance what is known as "Long Island blue clay" may be employed, the same containing argillaceous material combined with sulfid of iron finely distributed throughout the mass, with a small proportion of ligneous material. I have found that by the use of this blue clay, drying and pulverizing the same, heating, and adding from five to twenty per cent. of rosin oil, a most desirable composition is secured.

Where the dark color resulting from the presence of iron in the sulfid is objectionable, I preliminarily treat the clay with nitric acid solution or other material which will form a solution of the iron, which may be washed away leaving the sulfur, after which the material is heated and oil added as before, but with the result that the product is of a light gray color. This may be otherwise colored by adding suitable metallic oxids.

I claim as my invention:

The within described process of producing a composition for coating and other purposes having clay for its base the same consisting in heating blue clay containing sulfid of iron, adding oil in less proportion than the clay as the sulfur in the clay begins to sublimate, and then working the materials until thoroughly mixed.

In testimony whereof I affix my signature in presence of two witnesses.

ROBERT D. POWERS.

Witnesses:
 JOHN C. GRAY,
 EDWIN TAYLOR.